(12) United States Patent
Jiang et al.

(10) Patent No.: US 11,288,599 B2
(45) Date of Patent: Mar. 29, 2022

(54) MODEL TRAINING METHOD, APPARATUS, AND DEVICE, AND DATA SIMILARITY DETERMINING METHOD, APPARATUS, AND DEVICE

(71) Applicant: Advanced New Technologies Co., Ltd., Grand Cayman (KY)

(72) Inventors: Nan Jiang, Zhejiang (CN); Hongwei Zhao, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/777,659

(22) Filed: Jan. 30, 2020

(65) Prior Publication Data
US 2020/0167693 A1 May 28, 2020

Related U.S. Application Data

(63) Continuation of application No. 16/577,100, filed on Sep. 20, 2019, which is a continuation of application No. PCT/CN2018/096252, filed on Jul. 19, 2018.

(30) Foreign Application Priority Data

Jul. 19, 2017 (CN) .......................... 201710592780.7

(51) Int. Cl.
*G06K 9/00* (2006.01)
*G06Q 30/02* (2012.01)
(Continued)

(52) U.S. Cl.
CPC ......... *G06N 20/00* (2019.01); *G06K 9/00268* (2013.01); *G06K 9/00288* (2013.01);
(Continued)

(58) Field of Classification Search
CPC ............... G06N 20/00; G06K 9/00268; G06K 9/00288; G06K 9/6256; G10L 15/02; G10L 15/063
(Continued)

(56) References Cited

U.S. PATENT DOCUMENTS 7,308,581 B1 * 12/2007 Geosimonian .......... G06F 21/32
713/182
7,321,854 B2 * 1/2008 Sharma .............. G06K 9/00335
704/243

(Continued)

FOREIGN PATENT DOCUMENTS

| CN | 102129574 A | 7/2011 |
| CN | 102663370 A | 9/2012 |

(Continued)

OTHER PUBLICATIONS

Extended European Search Report for Application No. 18836065.5, dated Apr. 16, 2020.
(Continued)

*Primary Examiner* — Brandon S Cole
(74) *Attorney, Agent, or Firm* — Finnegan, Henderson, Farabow, Garrett & Dunner, LLP

(57) ABSTRACT

A model training method includes: acquiring a plurality of user data pairs, wherein data fields of two sets of user data in each user data pair have an identical part; acquiring a user similarity corresponding to each user data pair, wherein the user similarity is a similarity between users corresponding to the two sets of user data in each user data pair; determining, according to the user similarity corresponding to each user data pair and the plurality of user data pairs, sample data for training a preset classification model; and training the classification model based on the sample data to obtain a similarity classification model.

16 Claims, 8 Drawing Sheets

(51) Int. Cl.
  *G06F 21/32*   (2013.01)
  *G06Q 30/06*   (2012.01)
  *G06F 16/24*   (2019.01)
  *G06N 20/00*   (2019.01)
  *G06K 9/62*    (2022.01)
  *G10L 15/02*   (2006.01)
  *G10L 15/06*   (2013.01)

(52) U.S. Cl.
  CPC ............ *G06K 9/6256* (2013.01); *G10L 15/02* (2013.01); *G10L 15/063* (2013.01)

(58) Field of Classification Search
  USPC ........................................................ 706/1–62
  See application file for complete search history.

(56) References Cited

U.S. PATENT DOCUMENTS

| | | | | |
|---|---|---|---|---|
| 9,036,876 | B2* | 5/2015 | Rane | G06F 21/32 382/124 |
| 9,788,777 | B1* | 10/2017 | Knight | G10L 25/63 |
| 10,027,888 | B1* | 7/2018 | Mackraz | H04N 13/383 |
| 10,074,371 | B1* | 9/2018 | Wang | G10L 15/30 |
| 2007/0255959 | A1* | 11/2007 | Jung | H04L 9/3273 713/183 |
| 2008/0086533 | A1* | 4/2008 | Neuhauser | A61B 5/489 709/206 |
| 2008/0106370 | A1* | 5/2008 | Perez | G10L 17/00 340/5.7 |
| 2008/0133441 | A1 | 6/2008 | West et al. | |
| 2014/0063237 | A1* | 3/2014 | Stone | H04N 7/181 348/143 |
| 2014/0241574 | A1 | 8/2014 | Wang et al. | |
| 2014/0250523 | A1* | 9/2014 | Savvides | G06F 21/32 726/19 |
| 2015/0356974 | A1 | 12/2015 | Tani et al. | |
| 2017/0330029 | A1* | 11/2017 | Turcot | A61B 5/1176 |
| 2018/0012006 | A1* | 1/2018 | Suh | G06F 21/32 |
| 2018/0227273 | A1* | 8/2018 | Shumsker | H04L 63/0421 |

FOREIGN PATENT DOCUMENTS

| | | |
|---|---|---|
| CN | 103745242 A | 4/2014 |
| CN | 105224623 A | 1/2016 |
| CN | 105306495 A | 2/2016 |
| CN | 105488463 A | 4/2016 |
| JP | 2013065336 A | 4/2013 |
| WO | WO 2014/112375 A1 | 7/2014 |

OTHER PUBLICATIONS

Aleksic, Peter S. et al., *Audio Visual Biometrics*, Proceedings of the IEEE, vol. 94, No. 11, Nov. 2006, pp. 2025-2044.

Priya, B. Laksmi et al., *Authentication of Identical Twins Using Tri Modal Matching*, World Congress on Computing and Communication Technologies (WCCCT), Feb. 2, 2017, pp. 30-33.

International Search Report for International Application No. PCT/CN2018/096252, dated Oct. 22, 2018.

Written Opinion of the Intellectual Property Office of Singapore in Application No. 11201907257S, dated Apr. 28, 2020.

Office Action of Japanese Application No. 2019-543107, dated Dec. 11, 2020.

Examination Report for European Application No. 18836065.5, dated May 17, 2021.

Hu et al., Fine-Grained Face Verification: Dataset and Baseline Results, 2015 International Conference on Biometrics (ICB), IEEE, May 19, 2015, pp. 79-84.

Decision to Grant Japanese Application No. 2019-543107, dated Apr. 16, 2021.

Notice of Preliminary Rejection of Korean Application No. 10-2019-7023923, dated Apr. 16, 2021.

Examination Report of Indian Application No. 201937031659 dated Apr. 28, 2021.

Notice of the Result of Substantive Examination of Indonesian Application No. PID201906872, dated Oct. 5, 2021.

Decision of Patent Grant of Korean Application No. 10-2019-7023923, dated Oct. 8, 2021.

* cited by examiner

MODEL TRAINING METHOD, APPARATUS, AND DEVICE, AND DATA SIMILARITY DETERMINING METHOD, APPARATUS, AND DEVICE

CROSS-REFERENCE TO RELATED APPLICATIONS

This application is a continuation of U.S. application Ser. No. 16/577,100, filed on Sep. 20, 2019, which is a continuation application of International Application No. PCT/CN2018/096252, filed on Jul. 19, 2018, which is based upon and claims priority to Chinese Patent Application No. 201710592780.7, filed on Jul. 19, 2017, the entire content of all of which is incorporated herein by reference.

TECHNICAL FIELD

The present application relates to the field of computer technologies, and more particularly to a model training method, apparatus, and device, and a data similarity determining method, apparatus, and device.

TECHNICAL BACKGROUND

As a novel identity verification method, face recognition has created new risks while providing convenience to users. For a plurality of users having very similar looks (such as twins), it is difficult to effectively distinguish different users through face recognition, which is very likely to cause risks of account mis-registration and misappropriation of account funds due to the inability to correctly identify the users. As the most typical known case involving very similar looks, twins, especially identical twins, are closely related to each other and are very likely to engage in behaviors associated with the above risks. How to determine user data of twins from a large amount of data has become an important issue to be solved.

Generally, based on a supervised machine learning method, a recognition model is constructed using pre-selected sample data. Specifically, an investigator conducts a social survey through questionnaires, prize-winning questions, or manual observations, collects user data, and obtains and labels an association or twin relationship between users through manual observation or by asking people to be investigated. Based on the manually labeled association or twin relationship, the identification model is constructed by using the corresponding user data as sample data.

However, the above-mentioned identification model constructed by using the supervised machine learning method requires manual labeling of the sample data, and the manual labeling process consumes a large amount of manpower resources, and also consumes a large amount of time for labeling, thus making the model training inefficient and leading to high resource consumption.

SUMMARY

In a first aspect, there is provided a model training method. The method includes: acquiring a plurality of user data pairs, where data fields of two sets of user data in each user data pair have an identical part; acquiring a user similarity corresponding to each user data pair, wherein the user similarity is a similarity between users corresponding to the two sets of user data in each user data pair; determining, according to the user similarity corresponding to each user data pair and the plurality of user data pairs, sample data for training a preset classification model; and training the classification model based on the sample data to obtain a similarity classification model.

In a second aspect, there is provided a data similarity determining method. The method includes: acquiring a to-be-detected user data pair, the to-be-detected user data pair including two sets of to-be-detected user data; performing feature extraction on each set of to-be-detected user data in the to-be-detected user data pair to obtain to-be-detected user features; and determining a similarity between users corresponding to the two sets of to-be-detected user data in the to-be-detected user data pair according to the to-be-detected user features and a pre-trained similarity classification model.

In a third aspect, there is provided a model training apparatus. The apparatus includes: a data acquiring module acquiring a plurality of user data pairs, wherein data fields of two sets of user data in each user data pair have an identical part; a similarity acquiring module acquiring a user similarity corresponding to each user data pair, wherein the user similarity is a similarity between users corresponding to the two sets of user data in each user data pair; a sample data determining module determining, according to the user similarity corresponding to each user data pair and the plurality of user data pairs, sample data for training a preset classification model; and a model training module training the classification model based on the sample data to obtain a similarity classification model.

In a fourth aspect, there is provided a data similarity determining apparatus. The apparatus includes: a to-be-detected data acquiring module acquiring a to-be-detected user data pair, the to-be-detected user data pair including two sets of to-be- detected user data; a feature extraction module performing feature extraction on each set of to-be-detected user data in the to-be-detected user data pair to obtain to-be-detected user features; and a similarity determining module determining a similarity between users corresponding to the two sets of to-be-detected user data in the to-be-detected user data pair according to the to-be-detected user features and a pre-trained similarity classification model.

In a fifth aspect, there is provided a model training device. The device includes: a processor; and a memory configured to store instructions, wherein the processor is configured to execute the instructions to: acquire a plurality of user data pairs, wherein data fields of two sets of user data in each user data pair have an identical part; acquire a user similarity corresponding to each user data pair, wherein the user similarity is a similarity between users corresponding to the two sets of user data in each user data pair; determine, according to the user similarity corresponding to each user data pair and the plurality of user data pairs, sample data for training a preset classification model; and train the classification model based on the sample data to obtain a similarity classification model.

In a sixth aspect, there is provided a data similarity determining device. The device includes: a processor; and a memory configured to store instructions, wherein the processor is configured to execute the instructions to: acquire a to-be-detected user data pair, the to-be-detected user data pair including two sets of to-be-detected user data; perform feature extraction on each set of to-be-detected user data in the to-be-detected user data pair, to obtain to-be-detected user features; and determine a similarity between users corresponding to the two sets of to-be-detected user data in the to-be-detected user data pair according to the to-be-detected user features and a pre-trained similarity classification model.

As can be seen from the technical solutions provided by the embodiments of the specification, a plurality of user data pairs may be acquired, wherein data fields of two sets of user data in each user data pair may have an identical part; a user similarity corresponding to each user data pair may be acquired; sample data for training a preset classification model may be determined; and the classification model may be trained based on the sample data to obtain a similarity classification model, so that a similarity between users corresponding to the two sets of to-be-detected user data in a to-be-detected user data pair can be determined according to the similarity classification model. In this way, a plurality of user data pairs may be obtained through the same data field, and an association between users corresponding to the two sets of user data in each user data pair may be determined according to the user similarity to obtain sample data for training a preset classification model. Accordingly, the sample data can be obtained without manual labeling, so that rapid training of a model can be implemented, the model training efficiency can be improved, and the resource consumption can be reduced.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Embodiments of the specification provide a model training method, apparatus, and device, and a data similarity determining method, apparatus, and device.

Embodiments of the specification will be described below with reference to the accompanying drawings. The described embodiments are merely examples rather than all embodiments consistent with the specification. All other embodiments obtained by those of ordinary skill in the art based on the example embodiments shall fall within the protection scope of the specification.

Embodiment 1

Figure 1:
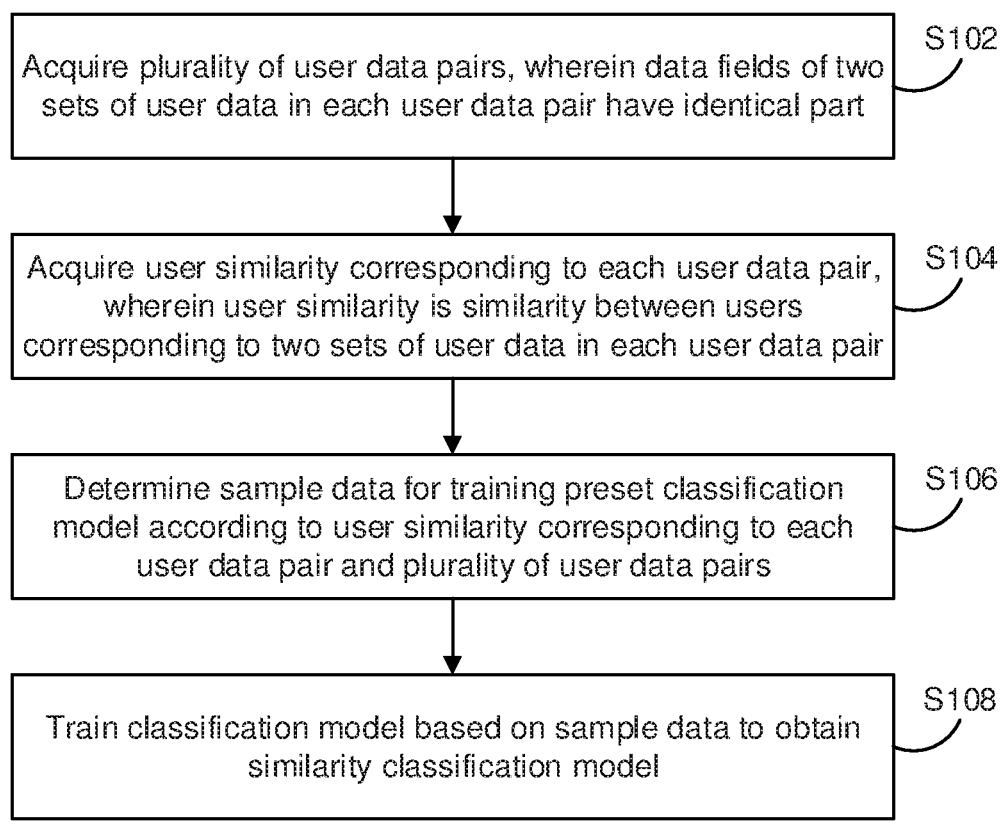
FIG. 1 is a flowchart of a model training method according to an embodiment.

FIG. 1 is a flowchart of a model training method 100 according to an embodiment. The method 100 may be executed by a terminal device or a server. The terminal device may be a personal computer or the like. The server may be an independent single server or may be a server cluster formed by a plurality of servers. As an example, the method 100 may be executed by a server to improve the model training efficiency. The method 100 may include the following steps.

In step S102, a plurality of user data pairs are acquired, wherein data fields of two sets of user data in each user data pair have an identical part.

In some embodiments, each user data pair may include user data of a plurality of different users. For example, the plurality of user data pairs may include a user data pair A and a user data pair B. The user data pair A may include user data 1 and user data 2, and the user data pair B may include user data 3 and user data 4, etc. The user data may be data related to a user, which may include, for example, identity information such as a name, age, height, address, identity card number, and social security card number of the user, and may also include information such as an interest, a purchased product, travel, etc. of the user. The data field may be a field or character capable of representing identities of users corresponding to the two sets of different user data in the user data pair as well as an association between the users. For example, the data field may include a surname, a preset quantity of digits in the identity card number (e.g., the first 14 digits in the identity card number), a social security card number or other identity numbers capable of determining the user identity or information, and so on.

In an embodiment, the user data may be acquired in various manners. For example, the user data may be purchased from different users, or may be information entered by the user when the user registers with a website or application, such as information entered when the user registers with Alipay®, or may be user data actively uploaded by the user. The specific manner in which the user data is acquired is not limited in the embodiments of the specification. After the user data is acquired, data fields included in the acquired user data may be compared to find user data having data fields that share an identical part. The user data having data fields that share an identical part may be grouped together to form a user data pair. By means of the above method, a plurality of user data pairs may be obtained, in which data fields of user data in each user data pair have an identical part.

For example, in some embodiments, to reduce the amount of computation and improve the processing efficiency as much as possible, the data fields may be set as identity card numbers and surnames, and information such as the identity card number and the name of the user may be searched in the user data considering that one or more digits (e.g., the first 14 digits of the identity card number) in the identity card number can represent the relationship between two users. In an embodiment, the first 14 digits of the identity card number may be used as a basis for determining whether data fields have an identical part. For example, the first 14 digits of the identity card number and surname of each user may be acquired, and the first 14 digits of the identity card numbers and the surnames of different users may be compared. Two sets of user data that have the same surname and the same first 14 digits of the identity card number may be grouped into one user data pair. In some embodiments, the user data pair may be stored in the form of a user pair, such as {identity card number of user 1, identity card number of user 2, name of user 1, name of user 2, other data of user 1, other data of user 2} or the like.

It should be noted that, the data fields of the two sets of user data having an identical part may be construed as that some contents in the data fields are identical (e.g., the first 14 digits in 18-digit identity card numbers), or may be construed as that all contents of the data fields are identical.

Still referring to FIG. 1, in step S104, a user similarity corresponding to each user data pair is acquired, wherein the user similarity is a similarity between users corresponding to the two sets of user data in each user data pair.

In some embodiments, the user similarity may be used for representing the degree of similarity between a plurality of users, for example, 99% or 50%. In some embodiments, the user similarity may also be represented in other manners. For example, the user similarity may also be represented by twins and non-twins, or by identical twins and fraternal twins.

In an embodiment, a classification model may be trained, which requires sample data for training the classification model as well as a user similarity corresponding to the sample data. The user similarity may be prestored in a server or a terminal device. The user similarity may be determined in various manners. One example processing method may include the following operations: images of users may be acquired in advance, wherein the images may be uploaded by the users when registering with an application or website, and the users may be users corresponding to the two sets of user data included in each user data pair. The images in each user data pair may be compared, through which the similarity between the users corresponding to the two sets of user data included in the user data pair may be calculated. During the image comparison process, processing methods such as image preprocessing, image feature extraction, and image feature comparison may be used, which are not limited in the embodiments of the specification.

Still referring to FIG. 1, in step S106, according to the user similarity corresponding to each user data pair and the plurality of user data pairs, sample data for training a preset classification model is determined.

In some embodiments, the classification model may be any classification model, such as a naive Bayesian classification model, a logistic regression classification model, a decision tree classification model, or a support vector machine classification model. In some embodiments, when the classification model is used only for determining whether two different users are similar, the classification model may be a binary classification model. The sample data may be data used for training the classification model. The sample data may be the two sets of user data in the user data pair, and may also be data obtained after the above user data is processed in a certain manner. For example, feature extraction may be performed on the above user data to obtain a corresponding user feature, and data of the user feature may be used as the sample data.

In an embodiment, a similarity threshold (e.g., 80% or 70%) may be set in advance. The user similarity corresponding to each user data pair may be respectively compared with the similarity threshold. The user data pairs corresponding to the user similarities greater than or equal to the similarity threshold may be grouped into one set, the user data pairs corresponding to the user similarities less than the similarity threshold may be grouped into one set, a predetermined quantity (e.g., 40000 or 50000) of user data pairs may be selected from each of the above two sets, and the selected user data pairs may be used as the sample data for training the preset classification model.

It should be noted that, the sample data for training the preset classification model may be selected in various manners other than the above manner. For example, features of the two sets of user data included in each user data pair may be extracted to obtain corresponding user features, and the user features may be grouped into the above two sets according to the user similarity corresponding to each user data pair and the similarity threshold. Data of the two sets of user features may be used as the sample data for training the preset classification model.

Still referring to FIG. 1, in step S108, the classification model is trained based on the sample data to obtain a similarity classification model.

In some embodiments, the similarity classification model may be a model used for determining the degree of similarity between different users.

In an embodiment, when the selected user data pairs are used as the sample data for training the preset classification model, feature extraction may be performed on the two sets of user data in each of the selected user data pairs to obtain a corresponding user feature, and the user features of each user data pair in the sample data may be input to the classification model for calculation. After the calculation, a calculation result may be output. The calculation result may be compared with the user similarity corresponding to the corresponding user data pair to determine whether the two are the same. If the calculation result and the corresponding user similarity are not the same, a related parameter of the classification model may be changed, the user features of the user data pair may be input to the modified classification model for calculation, and whether the calculation result is the same as the user similarity may be determined. The procedure may be repeated until the calculation result and the user similarity are the same. If the two are the same, the above processing procedure may be performed on the next selected user data pair. Finally, if the calculation result obtained after the user features of each user data pair are input to the classification model is the same as the user similarity corresponding to the corresponding user data pair, the obtained classification model may be used as the similarity classification model.

By means of the above method, the similarity classification model may be obtained. For use of the similarity classification model, reference can be made to the following related contents.

Figure 2:
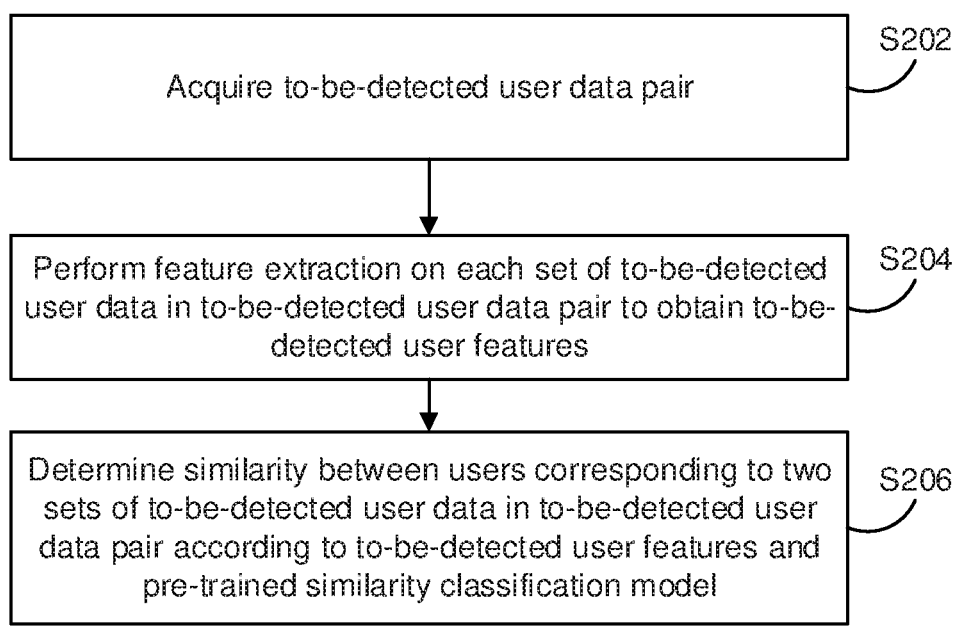
FIG. 2 is a flowchart of a data similarity determining method according to an embodiment.

FIG. 2 is a flowchart of a similarity determining method 200 according to an embodiment. The method 200 may be executed by a terminal device or a server. The terminal device may be a personal computer or the like. The server may be an independent single server or may be a server cluster formed by a plurality of servers. The method 200 may include the following steps.

In step S202, a to-be-detected user data pair is acquired. In some embodiments, the to-be-detected user data pair may be a user data pair formed by user data of two users to be detected.

Figure 3:
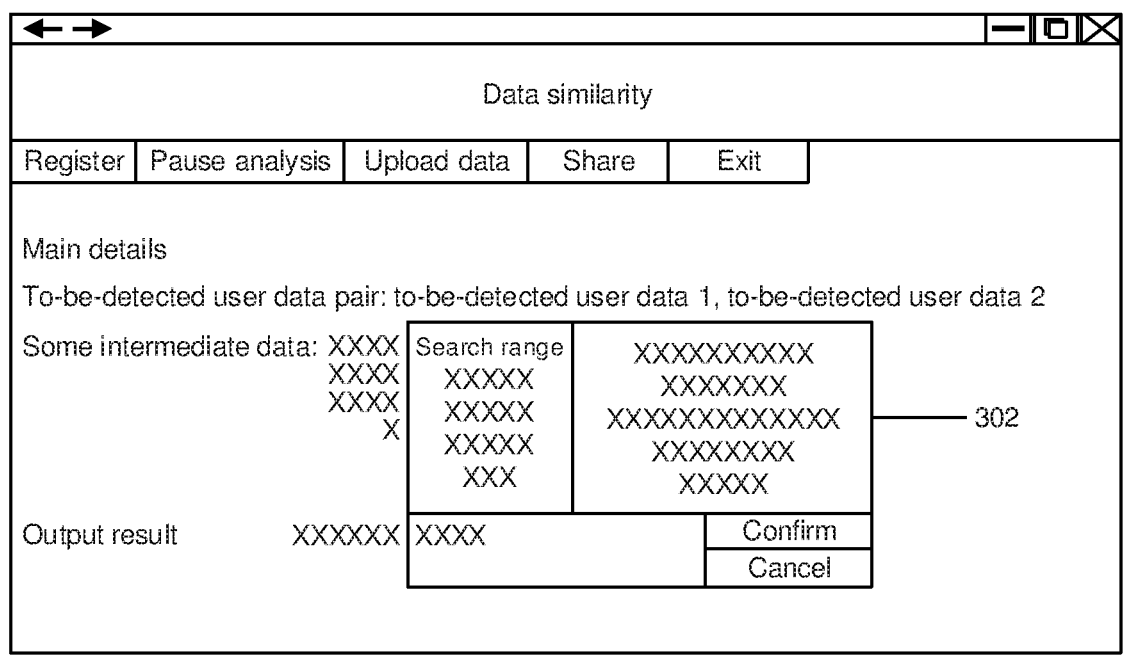
FIG. 3 is a schematic diagram of an interface of a detection application according to an embodiment.

In an embodiment, to detect the similarity between two different users, a corresponding detection application may be set. FIG. 3 is a schematic diagram of an interface 300 of a detection application according to an embodiment. The interface 300 may include a button for uploading data. When the similarity between two different users is to be detected, the button for uploading data may be tapped. The detection application may pop up a prompt box 302 for uploading data. A data uploader may input data of the to-be-detected user data pair in the prompt box 302, and a confirmation button in the prompt box 302 may be tapped when the input is completed. The detection application may acquire the to-be-detected user data pair input by the data uploader. The detection application may be installed on a terminal device or a server. If the similarity determining method 200 is executed by a server and the detection application is installed on a terminal device, the detection application may send the to-be-detected user data pair to the server after acquiring the to-be-detected user data pair, so that the server may acquire the to-be-detected user data pair. If the detection application is installed on the server, the server may directly acquire the to-be-detected user data pair from the detection application.

Referring back to FIG. 2, in step S204, feature extraction is performed on each set of to-be-detected user data in the to-be-detected user data pair to obtain to-be-detected user features.

In some embodiments, the to-be-detected user features may include a feature of the user data of the user to be detected.

In an embodiment, each set of to-be-detected user data in the to-be-detected user data pair may be acquired. For any set of to-be-detected user data, a corresponding feature may be extracted from the to-be-detected user data by using a preset feature extraction algorithm, and the extracted feature may be used as a to-be-detected user feature corresponding to the to-be-detected user data. By means of the above method, the to-be-detected user feature corresponding to each set of to-be-detected user data in the to-be-detected user data pair may be obtained.

It should be noted that the feature extraction algorithm may be any algorithm capable of extracting a predetermined feature from the user data, and specifically may be set according to actual situations.

Still referring to FIG. 2, in step S206, a similarity is determined between users corresponding to the two sets of to-be-detected user data in the to-be-detected user data pair according to the to-be-detected user features and a pre-trained similarity classification model.

In an embodiment, the to-be-detected user feature obtained through step S204 may be input to the similarity classification model obtained through step S102 to step S108 for calculation. The result output from the similarity classification model may be the similarity between the users corresponding to the two sets of to-be-detected user data in the to-be-detected user data pair.

It should be noted that, in some embodiments, the direct output result of the similarity classification model may be presented in percentage, for example, 90% or 40%. To make the output result more intuitive for the user, the direct output result of the similarity classification model may further be set according to actual situations, such as when identical twins and non-identical twins are to be distinguished, or when identical twins and fraternal twins are to be distinguished. In view of the above case, a classification threshold may be set. If the direct output result is greater than or equal to the classification threshold, it may be determined that the users corresponding to the two sets of to-be-detected user data in the to-be-detected user data pair are identical twins; otherwise, the users may be determined as non-identical twins or fraternal twins. In this way, the similarity between the users corresponding to the two sets of to-be-detected user data in the to-be-detected user data pair may be rapidly determined according to the pre-trained similarity classification model, thereby improving the efficiency of determining the similarity between the users.

It should be noted that both the user data pair and the to-be-detected user data pair in the embodiments include two sets of user data, and in other embodiments, the model training method and the similarity determining method may also be applied to a user data combination and a to-be-detected user data combination including more than two sets of user data. For specific implementations, reference can be made to the related contents in the embodiments of the specification.

The embodiments provide a model training method and a similarity determining method, in which a plurality of user data pairs may be acquired, wherein data fields of two sets of user data in each user data pair may have an identical part; a user similarity corresponding to each user data pair may be acquired; sample data for training a preset classification model may be determined; and the classification model may be trained based on the sample data to obtain a similarity classification model, so that a similarity between users corresponding to the two sets of to-be-detected user data in a to-be-detected user data pair can be determined according to the similarity classification model. In this way, a plurality of user data pairs may be obtained only through the same data field, and an association between users corresponding to the two sets of user data in each user data pair may be determined according to the user similarity to obtain sample data for training a preset classification model, that is, the sample data can be obtained without manual labeling, so that rapid training of a model can be implemented, the model training efficiency can be improved, and the resource consumption can be reduced.

Embodiment 2

Figure 4:
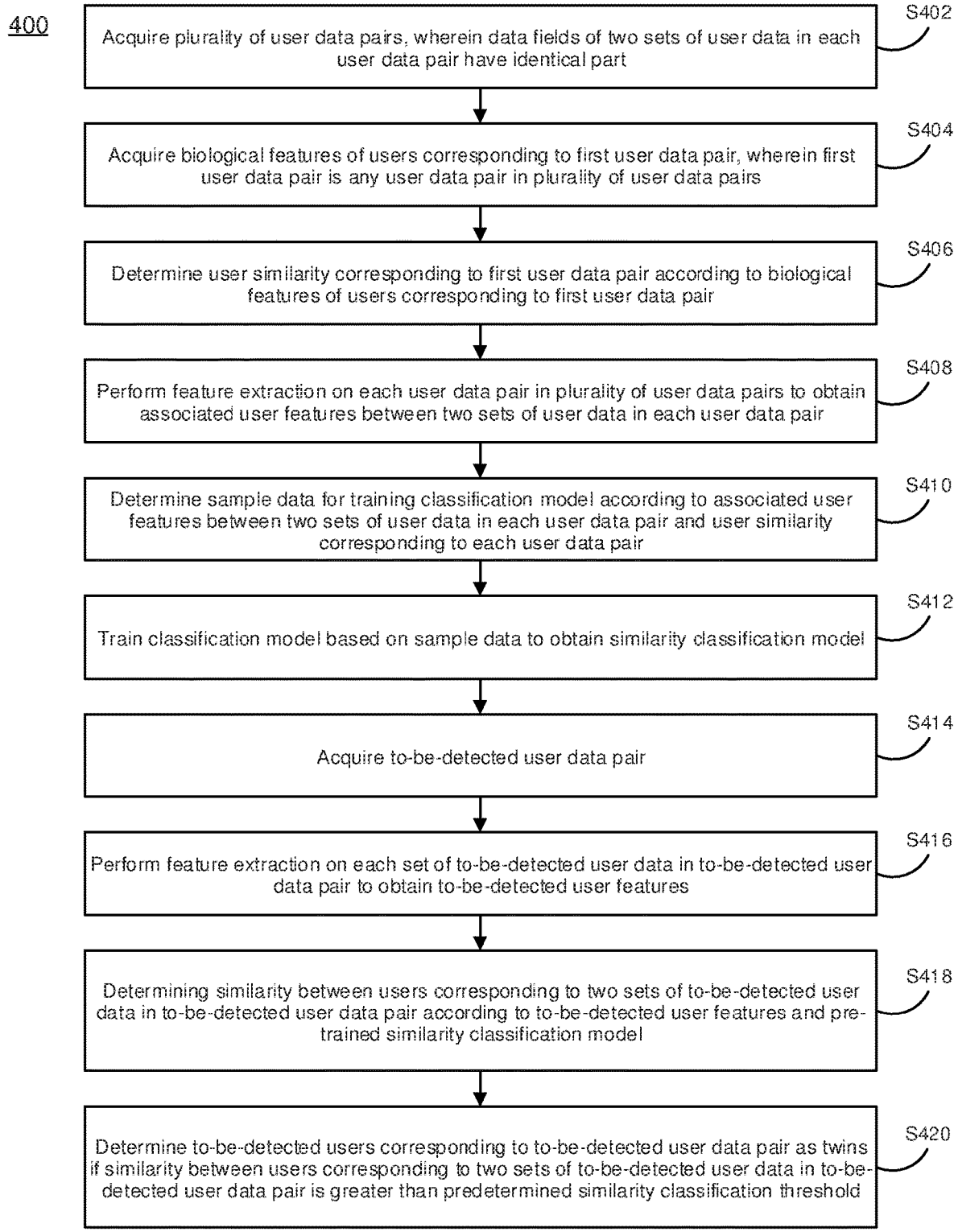
FIG. 4 is a flowchart of a data similarity determining method according to an embodiment.

FIG. 4 is a flow chart of a data similarity determining method 400 according to an embodiment. The method 400 may be executed by a server, or jointly by a terminal device and a server. The terminal device may be a personal computer or the like. The server may be an independent single server or may be a server cluster formed by a plurality of servers. In some embodiments, to improve the model training efficiency, the method 400 may be executed by a server. For the case that method 400 is implemented jointly by a terminal device and a server, reference can be made to the following related contents.

At present, as a novel user identity verification method face recognition has created new risks while providing convenience to users. For current face recognition technologies, an image of a user may be captured on site and compared with a user image of the user that is prestored in a database of a face recognition system, and if the value obtained through comparison reaches a predetermined threshold, it may be determined that the user is the user corresponding to the prestored user image, thus verifying the identity of the user. However, it may be difficult to effectively verify the identities of users having very similar faces by using the above method, which is very likely to cause account mis-registration and misappropriation of account funds due to the inability to verify the identity.

The typical known case involving very similar looks is twins, especially identical twins who are closely related to each other. If there is a list including as many twin users as possible, a face recognition strategy may be designed for these users to prevent the above risks. Therefore, a model for effectively identifying twins may be constructed to output a twin list for monitoring face recognition behavior of these users while ensuring high accuracy, thus achieving risk control. For the implementation of constructing the model for effectively identifying twins, reference can be made to the model training method 400, as described below.

In step S402, a plurality of user data pairs are acquired, wherein data fields of two sets of user data in each user data pair have an identical part.

In an embodiment, considering that twins generally have the same surname and the same portion, e.g., the same first 14 digits, of the identity card numbers, surnames and the first 14 digits of identity card numbers may be used as data fields for selecting the user data pair. For a specific implementation of step S402, reference can be made to the related content of step S102 in Embodiment 1.

In the above embodiment, the processing of selecting the user data pair may be implemented based on the surnames and the first 14 digits of the identity card numbers. In another embodiment, the processing of selecting the user data pair may also be implemented based on other information, for example, the surnames and the social security card numbers, or the first 14 digits of the identity card numbers and the social security card numbers, which is not limited in the embodiments of the specification.

Considering that the degree of similarity between the users corresponding to the two sets of user data in the user data pair is determined during model training, the following provides a related processing manner, as described in step S404 and step S406 below.

In step S404, biological features of users corresponding to a first user data pair are acquired, wherein the first user data pair is any user data pair in the plurality of user data pairs.

In some embodiments, the biological features may be physiological and behavioral features of a human body, such as a fingerprint feature, iris feature, facial feature, DNA, or other physiological features, or a voiceprint feature, handwriting feature, keystroke habit, or other behavioral features.

In an embodiment, after the plurality of user data pairs is acquired through step S402 above, a user data pair (referred to herein as the first user data pair) may be arbitrarily selected from the plurality of user data pairs. When the user uses a terminal device to log in to a server for registration, the user may upload one or more of the biological features of the user to the server. The server may store the biological feature and an identifier of the user in an associated manner. The identifier of the user may be a username or a name of the user input by the user during registration. The information stored in an associated manner in the server may be as shown in Table 1.

TABLE 1

| identifier of the user | biological feature |
|---|---|
| user 1 | biological feature A |
| user 2 | biological feature B |
| user 3 | biological feature C |

In some embodiments, after selecting the first user data pair, the server may extract identifiers of users included in the first user data pair, and may acquire corresponding biological features according to the identifiers of the users, thus obtaining the biological features of the users corresponding to the first user data pair. For example, the identifiers of the users included in the first user data pair may be user 2 and user 3, and by querying the corresponding relationships in Table 1, it may be determined that the user 2 corresponds to a biological feature B, and the user 3 corresponds to a biological feature C, that is, the biological features of the users corresponding to the first user data pair are the biological feature B and the biological feature C.

In step S406, a user similarity corresponding to the first user data pair is determined according to the biological features of the users corresponding to the first user data pair.

In an embodiment, after the biological features of the users corresponding to the first user data pair are obtained through step S404, similarity calculation may be respectively performed for the obtained biological features, so as to determine the degree of similarity between two corresponding users (i.e., the user similarity). The similarity calculation may be implemented in various manners, for example, according to a Euclidean distance between feature vectors, which is not limited in the embodiments of the specification.

In some embodiments, a threshold may be set for determining whether users are similar. For example, the threshold may be set to 70. When the user similarity corresponding to two biological features is greater than or equal to 70, it may be determined that the users corresponding to the two sets of user data in the first user data pair are similar; when the user similarity corresponding to the two biological features is less than 70, it may be determined that the users corresponding to the two sets of user data in the first user data pair are not similar.

By means of the above method, the processing procedure may be performed on other user data pairs in addition to the first user data pair in the plurality of user data pairs, so as to obtain the user similarity corresponding to each user data pair in the plurality of user data pairs.

In step S404 and step S406, the user similarity may be determined according to the biological features of the users. In some embodiments, the user similarity may be determined in other various manners. Step S404 and step S406 are further described below by using an example where the biological features are facial features, and reference can be made to the following step 1 and step 2 for details.

In step 1, facial images of the users corresponding to the first user data pair are acquired, wherein the first user data pair is any user data pair in the plurality of user data pairs.

In an embodiment, after the plurality of user data pairs are acquired through step S402 above, a user data pair (referred to herein as the first user data pair) may be arbitrarily selected from the plurality of user data pairs. When the user uses a terminal device to log in to a server for registration, the user may upload an image including the face of the user to the server. The server may store the image and an identifier of the user in an associated manner. The identifier of the user may be a username or a name of the user input by the user during registration. The information stored in an associated manner in the server may be as shown in Table 2.

TABLE 2

| identifier of user | image including the face of the user |
|---|---|
| user 1 | image A |
| user 2 | image B |
| user 3 | image C |

In some embodiments, after acquiring the first user data pair, the server may extract identifiers of users included in the first user data pair, and may acquire corresponding images according to the identifiers of the users, thus obtaining the facial images of the users corresponding to the first user data pair. For example, the identifiers of the users included in the first user data pair may be user 2 and user 3, and by querying the corresponding relationships in the Table 2, it may be determined that the image including the face of the user and corresponding to the user 2 is an image B, and the image including the face of the user and corresponding to the user 3 is an image C, that is, the facial images of the users corresponding to the first user data pair are the image B and the image C.

In step 2, feature extraction is performed on the facial images to obtain facial image features, and the user similarity corresponding to the first user data pair is determined according to the facial image features of the users corresponding to the first user data pair.

In an embodiment, after the facial images of the users corresponding to the first user data pair are obtained through step 1, feature extraction may be respectively performed on the obtained facial images to obtain corresponding facial image features, and a corresponding feature vector may be obtained based on an extracted feature of each facial image; a Euclidean distance between feature vectors of any two facial images may be calculated, and according to the value of the Euclidean distance between the feature vectors, the degree of similarity between the two corresponding users (i.e., the user similarity) may be determined. The larger the value of the Euclidean distance between feature vectors is, the lower the user similarity is; the smaller the value of the Euclidean distance between feature vectors is, the higher the user similarity is.

It should be noted that, for facial images, two facial images may either be similar or not. Therefore, a threshold may be set for determining whether images are similar. For example, the threshold may be set to 70. When the user similarity corresponding to two facial images is greater than or equal to 70, it may be determined that the users corresponding to the two sets of user data in the first user data pair are similar; when the user similarity corresponding to two facial images is less than 70, it is determined that the users corresponding to the two sets of user data in the first user data pair are not similar.

For example, based on the example of step 1, feature extraction may be respectively performed on the image B and the image C, and corresponding feature vectors may be constructed respectively according to the extracted features to obtain a feature vector of the image B and a feature vector of the image C. A Euclidean distance between the feature vector of the image B and the feature vector of the image C may be calculated, and the user similarity between the user 2 and the user 3 may be determined according to the value of the obtained Euclidean distance.

By means of the above method, the processing procedure may be performed on other user data pairs in addition to the first user data pair in the plurality of user data pairs, so as to obtain the user similarity corresponding to each user data pair in the plurality of user data pairs.

In addition, for processing of step S404 and step S406, the following further provides an optional processing manner, and reference can be made to the following step 1 and step 2 for details.

In step 1, speech data of the users corresponding to the first user data pair is acquired, wherein the first user data pair is any user data pair in the plurality of user data pairs.

In an embodiment, after the plurality of user data pairs are acquired through step S402 above, a user data pair (referred to herein as the first user data pair) may be arbitrarily selected from the plurality of user data pairs. When the user uses a terminal device to log in to a server for registration, the user may upload speech data having a predetermined duration (for example, 3 seconds or 5 seconds) and/or including a predetermined speech content (for example, speech of one or more words or one sentence) to the server.

The server may store the speech data and an identifier of the user in an associated manner. After selecting the first user data pair, the server may respectively extract the identifiers of the users included in the first user data pair, and acquire corresponding speech data according to the identifiers of the users, thus obtaining the speech data of the users corresponding to the first user data pair.

In step 2, feature extraction is performed on the speech data to obtain speech features, and the user similarity corresponding to the first user data pair is determined according to the speech features of the users corresponding to the first user data pair.

In an embodiment, after the speech data of the users corresponding to the first user data pair are obtained through step 1 above, feature extraction may be respectively performed on the obtained speech data, and based on an extracted feature of each piece of speech data, the degree of similarity between the two corresponding users (i.e., the user similarity) may be determined. For a specific implementation, reference can be made to the related content in step S406. Alternatively and/or additionally, the user similarity may be determined through one-by-one comparison of features; or speech spectrum analysis may be performed for any two pieces of speech data to determine the user similarity. By means of the method, the processing procedure may be performed on other user data pairs in addition to the first user data pair in the plurality of user data pairs, so as to obtain the user similarity corresponding to each user data pair in the plurality of user data pairs.

Still referring to FIG. 4, in step S408, feature extraction is performed on each user data pair in the plurality of user data pairs to obtain associated user features between the two sets of user data in each user data pair.

In an embodiment, a user data pair (referred to herein as a third user data pair) may be arbitrarily selected from the plurality of user data pairs, and feature extraction may be respectively performed on two sets of different user data in the third user data pair. For example, the third user data pair may include user data 1 and user data 2, and feature extraction may be respectively performed on the user data 1 and the user data 2. Then, the associated user features between the two sets of user data in the third user data pair may be obtained by comparing features extracted from different user data. By means of the above method, the processing procedure may be performed on other user data pairs in addition to the third user data pair in the plurality of user data pairs, so as to obtain the associated user features between the two sets of user data in each user data pair.

In some embodiments, the user feature may include, but is not limited to, a household registration dimension feature, a name dimension feature, a social feature, and an interest feature, or the like. The household registration dimension feature may include a feature of user identity information. For example, the household registration dimension feature may be mainly based on the household registration management system of China. The identity card information included in the household registration may include the date of birth and the household registration place, and the household registration may include the parents' names and citizen's address. However, due to historical and other reasons, some citizens' registration information may not be the same as the actual situation. For example, the registered date of birth may be earlier than the real date, two children may respectively follow the parents' surnames, or even the divorce of the parents may lead to the separation of the household registration. Therefore, the household registration dimension feature may serve as a reference for determining whether the two users are twins. In this way, the association between different users may be determined depending on features such as whether different users corresponding to the user data pair have the same date of birth, the same household registration place, the same parents, or the same current address.

In some embodiments, the name dimension feature may include a feature of user name information and a feature of a degree of scarcity of a user surname. For the name dimension feature, based on the Nature Language Processing (NLP) theory and social experience, generally, if the names of two people look alike (e.g., Zhang Jinlong and Zhang Jinhu) or have a certain semantic relationship (e.g, Zhang Meimei and Zhang Lili), it may be considered that there is an association between the two. In some embodiments, the relationship between the names of the two users may be assessed using a dictionary, and the user's registered personal information and demographic data may be used to calculate the degree of scarcity of the surname as a feature. In this way, the association between different users may be determined depending on features such as whether different users corresponding to the user data pair have the same surname or have the same length of name, the degree of synonym of the names, whether the combination of the names is a phrase, the degree of scarcity of the surname, or the like.

In some embodiments, the social feature may include a feature of social relationship information of a user. In some embodiments, the social feature may be obtained by extracting a social relationship of the user data pair based on big data. Generally, twins would interact with each other frequently and have a highly overlapping social relationship, such as having the same relatives or classmates. In some embodiments, the user data pair may be associated based on a relationship network formed by personal information of users stored in the server and existing data, address books, or the like, to obtain corresponding features. In this way, the association between different users corresponding to the user data pair may be determined depending on features such as whether the different users follow each other in a social networking application, whether the different users have transferred funds between each other, whether the different users have saved contact information of the other party to the address book, whether the different users have marked a specific appellation for the other party in the address book, a quantity of common contacts between their address books, or the like.

In addition, considering that twins have many hobbies and shopping preferences in common and may travel together, the user feature may further include features of e-commerce, tourism, entertainment, and other dimensions. In some embodiments, data related to the features of e-commerce, tourism, entertainment and other dimensions may be acquired from a predetermined database or website. In this way, the association between different users corresponding to the user data pair may be determined depending on features such as a quantity of common shopping records between the different users, whether they have traveled together, whether they have checked in at a hotel at the same time, a similarity between their shopping preferences, whether they have the same delivery address, or the like.

It should be noted that, in some embodiments, the processing of determining the user similarity (including step S404 and step S406) and the processing of feature extraction (including step S408) may be executed in a chronological order. In some embodiments, the processing of determining the user similarity and the processing of feature extraction may be executed at the same time or in a reversed order, which is not limited in the embodiments of the specification.

Still referring to FIG. 4, in step S410, according to the associated user features between the two sets of user data in each user data pair and the user similarity corresponding to each user data pair, the sample data for training the classification model is determined.

In an embodiment, a threshold may be set in advance. According to the threshold, user data pairs corresponding to the user similarities greater than or equal to the threshold may be selected from the plurality of user data pairs. The associated user features between the two sets of user data in each of the selected user data pairs may be used as user features for training the classification model. The selected user features and the user similarities corresponding to the selected user data pairs may be determined as the sample data for training the classification model.

In some embodiments, the processing of step S410 may be implemented in various other manners. The following further provides an optional processing manner, including the following step 1 and step 2.

In step 1, positive sample features and negative sample features are selected from user features corresponding to the plurality of user data pairs according to the user similarity corresponding to each user data pair and a predetermined similarity threshold.

In an embodiment, based on the common sense that identical twins may have highly similar looks, the same date of birth and place of birth, and generally the same surname, the user similarity between the facial images of the two users may be calculated, so as to determine whether the two users are identical twins. For example, a similarity threshold (e.g., 80% or 70%) may be set in advance. User data pairs corresponding to the user similarities greater than or equal to the similarity threshold may be determined as user data pairs of identical twins, and user data pairs corresponding to the user similarities less than the similarity threshold may be determined as user data pairs of non-identical twins. Meanwhile, because identical twins and fraternal twins basically have the same features except in looks, user features corresponding to the user data pairs of identical twins may be used as positive sample features of the similarity classification model, and user features corresponding to the user data pairs of non-identical twins (including fraternal twins and non-twins) may be used as negative sample features of the similarity classification model.

It should be noted that, the negative sample features do not mean that features included therein are all user features of fraternal twins. In some embodiments, the user features of fraternal twins may account for a small portion in the negative sample features, or the negative sample features may include a small number of positive sample features, which may not affect the training of the classification model but will improve the robustness of the similarity classification model.

In addition, in some embodiments, the positive sample features may include the same quantity of features as the negative sample features. For example, 10000 user data pairs corresponding to the user similarities less than 10% may be selected from the plurality of user data pairs, 10000 user data pairs corresponding to the user similarities greater than 10% and less than 20% may be selected from the plurality of user data pairs, 10000 user data pairs corresponding to the user similarities greater than 20% and less than 30% may be selected from the plurality of user data pairs, 10000 user data pairs corresponding to the user similarities greater than 30% and less than 40% may be selected from the plurality of user data pairs, and 10000 user data pairs corresponding to the user similarities greater than 40% and less than 50% may be selected from the plurality of user data pairs. User features of the above 50000 user data pairs may be used as the negative sample features. For another example, 40000 user data pairs corresponding to the user similarities greater than 80% and less than 90% may be selected from the plurality of user data pairs, and 10000 user data pairs corresponding to the user similarities greater than 90% and less than 100% may be selected from the plurality of user data pairs. User features of the above 50000 user data pairs may be used as the positive sample features.

In step 2, the positive sample features and the negative sample features are used as the sample data for training the classification model.

In an embodiment, data of the user features and the corresponding user similarities may be combined, and the combined data may be used as the sample data for training the classification model.

Still referring to FIG. 4, in step S412, the classification model is trained based on the sample data to obtain a similarity classification model.

When the purpose of the classification model is to identify twins, the similarity classification model may be a binary classifier model, such as a Gradient Boosting Decision Tree (GBDT) binary classifier model.

In an embodiment, positive sample features may be respectively input to the classification model for calculation. The obtained calculation result may be compared with the user similarity corresponding to the positive sample feature. If the calculated result and the user similarity match each other, the next positive sample feature or negative sample feature may be selected and input to the classification model for calculation. The obtained calculation result may continue to be compared with the user similarity corresponding to the positive sample feature. If the calculated result and the user similarity do not match, a related parameter of the classification model may be adjusted, the positive sample feature may be input to the adjusted classification model for calculation, and the obtained calculation result may be compared with the user similarity corresponding to the positive sample feature again. The procedure may be repeated until the two match each other. By means of the above method, all the positive sample features and all the negative sample features may be input to the classification model for calculation, thus training the classification model. The final classification model obtained through training may be used as the similarity classification model.

Thus, the similarity classification model may be obtained through the above processing procedure. The similarity classification model may be applied to a face recognition scenario. For twins users who may engage in behavior related to risks, the similarity classification model can be used for separate risk control.

Figure 5:
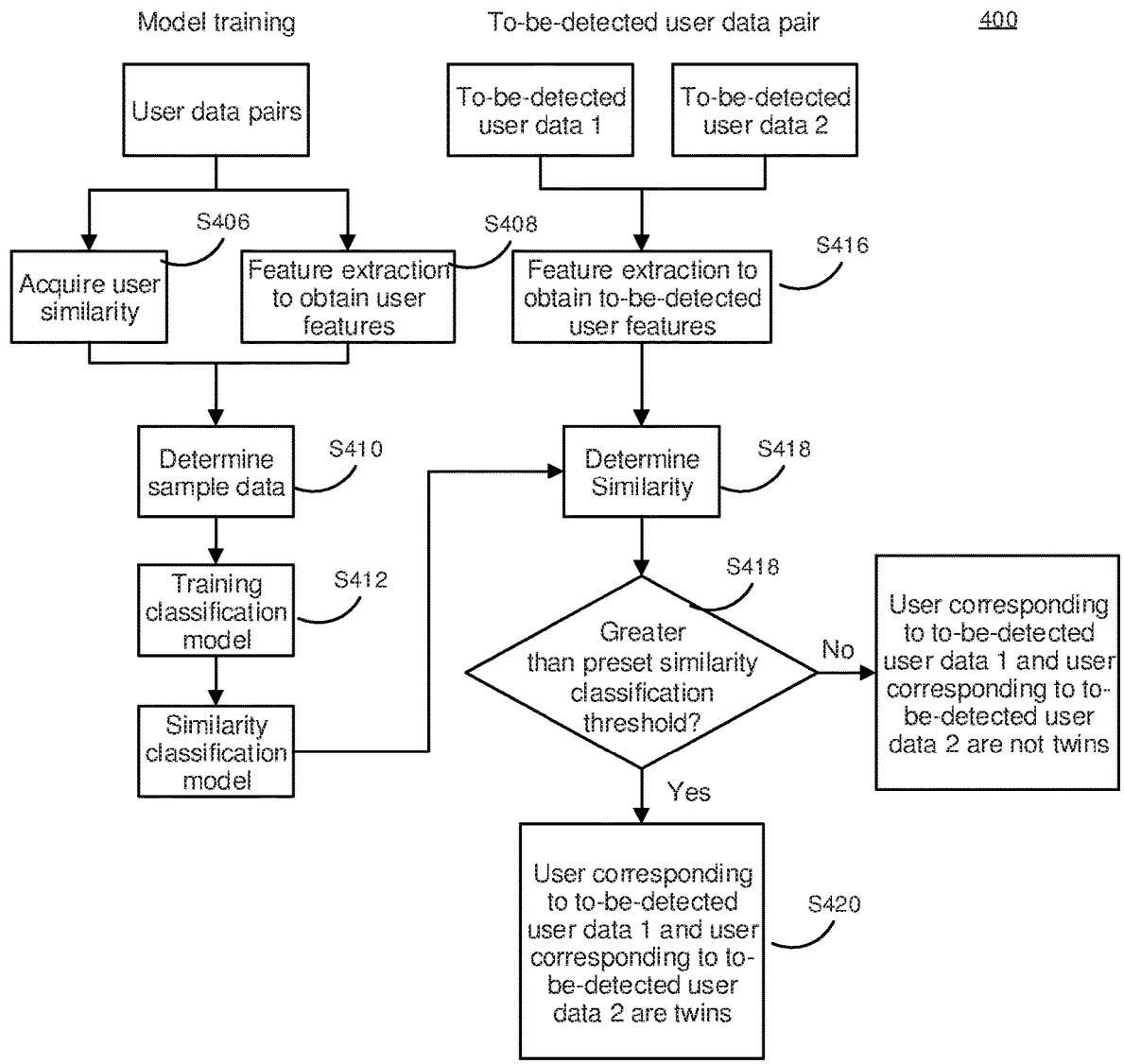
FIG. 5 is a schematic diagram of a data similarity determining process according to an embodiment.

In some embodiments, after the similarity classification model is obtained, it may be determined using the similarity classification model whether the to-be-detected users corresponding to the to-be-detected user data pair are twins, as shown in FIG. 5. For a specific implementation, reference can be made to the contents of the following step S414 to step S420.

Still referring to FIG. 4, in step S414, a to-be-detected user data pair is acquired, similar to or the same as step S202 in Embodiment 1. Reference can be made to the related contents of step S202 for a specific implementation of step S414.

In step S416, feature extraction is performed on each set of to-be-detected user data in the to-be-detected user data pair to obtain to-be-detected user features.

For the process of performing feature extraction on each set of to-be-detected user data in the to-be-detected user data pair to obtain to-be-detected user features in step S416, reference can be made to the related contents of step S408. That is, the features extracted from the to-be-detected user data may include, but are not limited to, a household registration dimension feature, a name dimension feature, a social feature, an interest feature, or the like.

In step S418, a similarity is determined between users corresponding to the two sets of to-be-detected user data in the to-be-detected user data pair according to the to-be-detected user features and the pre-trained similarity classification model, similar to or the same as step S206 in Embodiment 1. Reference can be made to the related contents of step S206 for a specific implementation of step S418.

In step S420, to-be-detected users corresponding to the to-be-detected user data pair are determined as twins if the similarity between the users corresponding to the two sets of to-be-detected user data in the to-be-detected user data pair is greater than or equal to a predetermined similarity classification threshold.

In an embodiment, because the output twin list affects the use of the face recognition of target users, high accuracy of the similarity classification model is desired for use. For example, the similarity classification threshold may be set to a large value, for example, 95% or 97%. The to-be-detected user feature may be predicted and scored by using the trained similarity classification model. The scoring process may be performed to calculate a probability that the users corresponding to the corresponding user data pair are twins. For example, if the probability is 80%, the score is 80; and if the probability is 90%, the score is 90. The higher the score is, the higher the probability that the users corresponding to the user data pair may be twins.

FIG. 5 is a schematic diagram of a data similarity determining process of the method 400 according to an embodiment. In the embodiment, the to-be-detected user data pair includes to-be-detected user data pair 1 and to-be-detected user data pair 2. The model training process and the data similarity determining process are similar to those described above in connection with FIG. 4 and will not be repeated here.

The embodiment of the specification provides a data similarity determining method, in which a plurality of user data pairs may be acquired, wherein data fields of two sets of user data in each user data pair have an identical part; a user similarity corresponding to each user data pair may be acquired; sample data for training a preset classification model may be determined; and the classification model may be trained based on the sample data to obtain a similarity classification model, so that a similarity between users corresponding to the two sets of to-be-detected user data in a to-be-detected user data pair can be determined subsequently according to the similarity classification model. In this way, a plurality of user data pairs may be obtained only through the same data field, and an association between users corresponding to the two sets of user data in each user data pair may be determined according to the user similarity to obtain sample data for training a preset classification model, that is, the sample data can be obtained without manual labeling, so that rapid training of a model can be implemented, the model training efficiency can be improved, and the resource consumption can be reduced.

Embodiment 3

Figure 6:
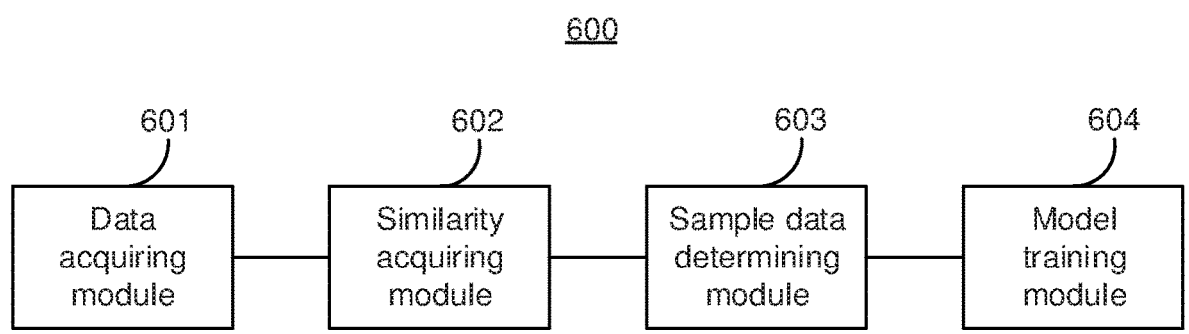
FIG. 6 is a schematic diagram of a model training apparatus according to an embodiment.

FIG. 6 is a schematic diagram of a model training apparatus 600 according to an embodiment. The apparatus 600 corresponds to the model training method described above.

The apparatus 600 may be disposed in a server. The apparatus 600 may include: a data acquiring module 601, a similarity acquiring module 602, a sample data determining module 603, and a model training module 604.

The data acquiring module 601 may be configured to acquire a plurality of user data pairs, wherein data fields of two sets of user data in each user data pair have an identical part. The similarity acquiring module 602 may be configured to acquire a user similarity corresponding to each user data pair, wherein the user similarity is a similarity between users corresponding to the two sets of user data in each user data pair. The sample data determining module 603 may be configured to determine, according to the user similarity corresponding to each user data pair and the plurality of user data pairs, sample data for training a preset classification model. The model training module 604 may be configured to train the classification model based on the sample data to obtain a similarity classification model.

In some embodiments, the similarity acquiring module 602 may include: a biological feature acquiring unit (not shown) configured to acquire biological features of users corresponding to a first user data pair, wherein the first user data pair is any user data pair in the plurality of user data pairs; and a similarity acquiring unit (not shown) configured to determine a user similarity corresponding to the first user data pair according to the biological features of the users corresponding to the first user data pair.

In some embodiments, the biological feature may include a facial image feature. The biological feature acquiring unit may be configured to acquire facial images of the users corresponding to the first user data pair, and perform feature extraction on the facial images to obtain facial image features.

Correspondingly, the similarity acquiring unit may be configured to determine the user similarity corresponding to the first user data pair according to the facial image features of the users corresponding to the first user data pair.

In some embodiments, the biological feature may include a speech feature. The biological feature acquiring unit may be configured to acquire speech data of the users corresponding to the first user data pair; and perform feature extraction on the speech data to obtain speech features.

Correspondingly, the similarity acquiring unit may be configured to determine the user similarity corresponding to the first user data pair according to the speech features of the users corresponding to the first user data pair.

In some embodiments, the sample data determining module 603 may include: a feature extraction unit (not shown) configured to perform feature extraction on each user data pair in the plurality of user data pairs to obtain associated user features between the two sets of user data in each user data pair; and a sample data determining unit (not shown) configured to determine, according to the associated user features between the two sets of user data in each user data pair and the user similarity corresponding to each user data pair, the sample data for training the classification model.

In some embodiments, the sample data determining unit may be configured to select positive sample features and negative sample features from user features corresponding to the plurality of user data pairs according to the user similarity corresponding to each user data pair and a pre-determined similarity threshold; and use the positive sample features and the negative sample features as the sample data for training the classification model.

In some embodiments, the user feature may include at least one of a household registration dimension feature, a name dimension feature, a social feature, or an interest feature, wherein the household registration dimension feature may include a feature of user identity information, the name dimension feature may include a feature of user name information and a feature of a degree of scarcity of a user surname, and the social feature may include a feature of social relationship information of a user.

In some embodiments, the positive sample features may include the same quantity of features as the negative sample features. In some embodiments, the similarity classification model may be a binary classifier model.

The embodiment of the specification provides a model training apparatus, in which a plurality of user data pairs may be acquired, wherein data fields of two sets of user data in each user data pair have an identical part; a user similarity corresponding to each user data pair may be acquired; sample data for training a preset classification model may be determined; and the classification model may be trained based on the sample data to obtain a similarity classification model, so that a similarity between users corresponding to the two sets of to-be-detected user data in a to-be-detected user data pair can be determined according to the similarity classification model. In this way, a plurality of user data pairs may be obtained through the same data field, and an association between users corresponding to the two sets of user data in each user data pair may be determined according to the user similarity to obtain sample data for training a preset classification model, that is, the sample data can be obtained without manual labeling, so that rapid training of a model can be implemented, the model training efficiency can be improved, and the resource consumption can be reduced.

Embodiment 4

Figure 7:
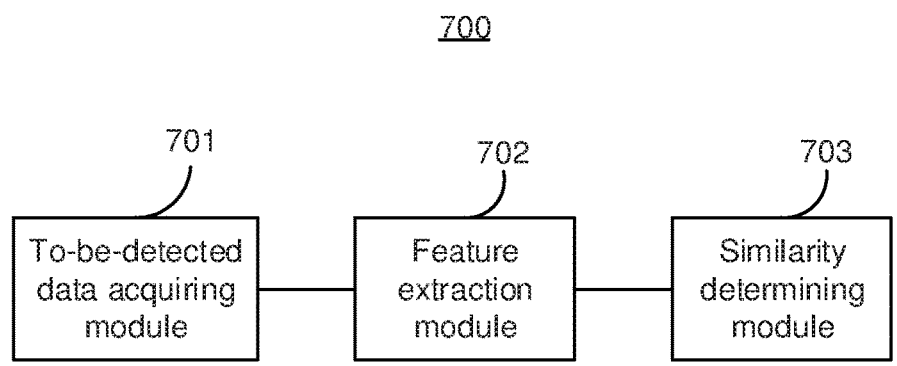
FIG. 7 is a schematic diagram of a data similarity determining apparatus according to an embodiment.

FIG. 7 is a schematic diagram of a data similarity determining apparatus 700 according to an embodiment. The apparatus 700 corresponds to the data similarity determination method described above.

The apparatus 700 may include: a to-be-detected data acquiring module 701, a feature extraction module 702, and a similarity determining module 703.

The to-be-detected data acquiring module 701 may be configured to acquire a to-be-detected user data pair. The feature extraction module 702 may be configured to perform feature extraction on each set of to-be-detected user data in the to-be-detected user data pair to obtain to-be-detected user features. The similarity determining module 703 may be configured to determine a similarity between users corresponding to the two sets of to-be-detected user data in the to-be-detected user data pair according to the to-be-detected user features and a pre-trained similarity classification model.

In some embodiments, the apparatus 700 may further include: a similarity classification module (not shown) configured to determine to-be-detected users corresponding to the to-be-detected user data pair as twins if the similarity between the users corresponding to the two sets of to-be-detected user data in the to-be-detected user data pair is greater than or equal to a predetermined similarity classification threshold.

The embodiment of the specification provides a data similarity determining apparatus, in which a plurality of user data pairs may be acquired, wherein data fields of two sets of user data in each user data pair have an identical part; a user similarity corresponding to each user data pair may be acquired; sample data for training a preset classification model may be determined; and the classification model may be trained based on the sample data to obtain a similarity classification model, so that a similarity between users corresponding to the two sets of to-be-detected user data in a to-be-detected user data pair can be determined according to the similarity classification model. In this way, a plurality of user data pairs may be obtained only through the same data field, and an association between users corresponding to the two sets of user data in each user data pair may be determined according to the user similarity to obtain sample data for training a preset classification model, that is, the sample data can be obtained without manual labeling, so that rapid training of a model can be implemented, the model training efficiency can be improved, and the resource consumption can be reduced.

Embodiment 5

Figure 8:
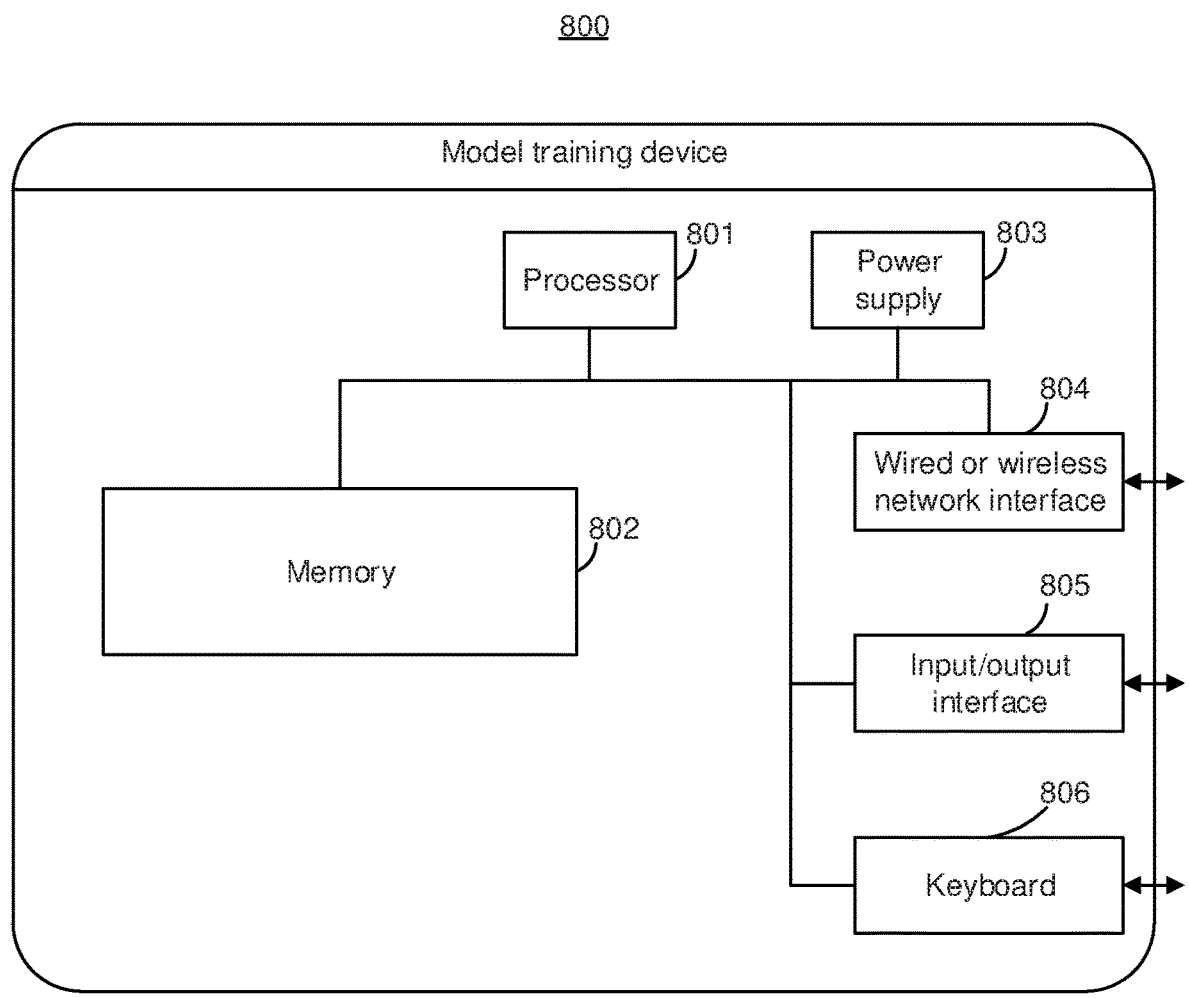
FIG. 8 is a schematic diagram of a model training device according to an embodiment.
Figure 9:
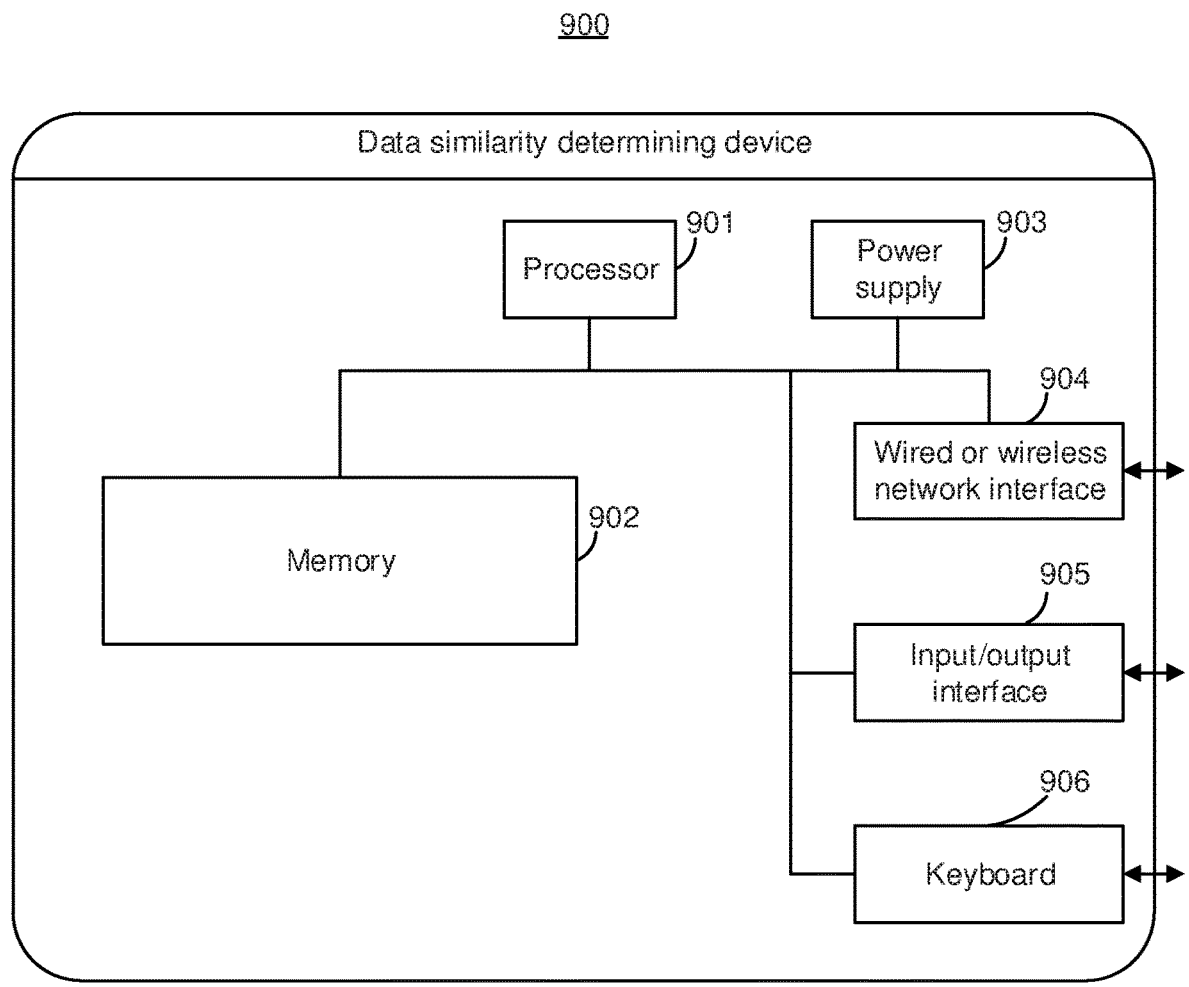
FIG. 9 is a schematic diagram of a data similarity determining device according to an embodiment.

FIG. 8 is a schematic diagram of a model training device 800 according to an embodiment. For example, the model training device 800 may be the server, the terminal device, or the like provided in the foregoing embodiments.

The model training device 800 may differ greatly depending on different configurations or performance, and may include one or more processors 801 and a memory 802. The memory 802 may store one or more storage applications or data. The memory 802 may be a transitory or permanent storage. The application stored in the memory 802 may include one or more modules (not shown), wherein each module may include a series of computer executable instructions. Still further, the one or more processors 801 may be configured to communicate with the memory 802, and execute, on the model training device 800, the series of computer executable instructions in the memory 802. The model training device may further include one or more power supplies 803, one or more wired or wireless network interfaces 804, one or more input/output interfaces 805, and one or more keyboards 806.

In an embodiment, the one or more processors 801 may be configured to execute the instructions to perform: acquiring a plurality of user data pairs, wherein data fields of two sets of user data in each user data pair have an identical part; acquiring a user similarity corresponding to each user data pair, wherein the user similarity is a similarity between users corresponding to the two sets of user data in each user data pair; determining, according to the user similarity corresponding to each user data pair and the plurality of user data pairs, sample data for training a preset classification model; and training the classification model based on the sample data to obtain a similarity classification model.

In an embodiment, the one or more processors 801 may be configured to execute the instructions to perform: acquiring biological features of users corresponding to a first user data pair, wherein the first user data pair is any user data pair the plurality of user data pairs; and determining a user similarity corresponding to the first user data pair according to the biological features of the users corresponding to the first user data pair.

In an embodiment, the biological feature may include a facial image feature. The acquiring biological features of users corresponding to a first user data pair may include: acquiring facial images of the users corresponding to the first user data pair; and performing feature extraction on the facial images to obtain facial image features. Correspondingly, the determining a user similarity corresponding to the first user data pair according to the biological features of the users corresponding to the first user data pair may include: determining the user similarity corresponding to the first user data pair according to the facial image features of the users corresponding to the first user data pair.

In an embodiment, the biological feature may include a speech feature. The acquiring biological features of users corresponding to a first user data pair may include: acquiring speech data of the users corresponding to the first user data pair; and performing feature extraction on the speech data, to obtain speech features. Correspondingly, the determining a user similarity corresponding to the first user data pair according to the biological features of the users corresponding to the first user data pair may include: determining the user similarity corresponding to the first user data pair according to the speech features of the users corresponding to the first user data pair.

In an embodiment, the one or more processors 801 may be configured to execute the instructions to perform: performing feature extraction on each user data pair in the plurality of user data pairs to obtain associated user features between the two sets of user data in each user data pair; and determining, according to the associated user features between the two sets of user data in each user data pair and the user similarity corresponding to each user data pair, the sample data for training the classification model.

In an embodiment, the one or more processors 801 may be configured to execute the instructions to perform: selecting positive sample features and negative sample features from user features corresponding to the plurality of user data pairs according to the user similarity corresponding to each user data pair and a predetermined similarity threshold; and using the positive sample features and the negative sample features as the sample data for training the classification model.

In an embodiment, the user feature may include at least one of a household registration dimension feature, a name dimension feature, a social feature, or an interest feature, wherein the household registration dimension feature may include a feature of user identity information, the name dimension feature may include a feature of user name information and a feature of a degree of scarcity of a user surname, and the social feature may include a feature of social relationship information of a user.

In an embodiment, the positive sample features include the same quantity of features as the negative sample features. In an embodiment, the similarity classification model is a binary classifier model.

The embodiment of the specification provides a model training device, in which a plurality of user data pairs may be acquired, wherein data fields of two sets of user data in each user data pair have an identical part; a user similarity corresponding to each user data pair may be acquired; sample data for training a preset classification model may be determined; and the classification model may be trained based on the sample data to obtain a similarity classification model, so that a similarity between users corresponding to the two sets of to-be-detected user data in a to-be-detected user data pair can be determined according to the similarity classification model. In this way, a plurality of user data pairs may be obtained only through the same data field, and an association between users corresponding to the two sets of user data in each user data pair may be determined according to the user similarity to obtain sample data for training a preset classification model, that is, the sample data can be obtained without manual labeling, so that rapid training of a model can be implemented, the model training efficiency can be improved, and the resource consumption can be reduced.

Embodiment 6

FIG. 6 is a schematic diagram of a data similarity determining device 900 according to an embodiment. For example, the data similarity determining device 900 may be the server, the terminal device, or the like provided in the foregoing embodiments.

The data similarity determining device 900 may differ greatly depending on different configurations or performance, and may include one or more processors 901 and a memory 902. The memory 902 may store one or more storage applications or data. The memory 902 may be a transitory or permanent storage. The application stored in the memory 902 may include one or more modules (not shown), wherein each module may include a series of computer executable instructions in the data similarity determining device. Still further, the one or more processors 901 may be configured to communicate with the memory 902, and execute, on the data similarity determining device 900, the series of computer executable instructions in the memory 902. The data similarity determining device 900 may further include one or more power supplies 903, one or more wired or wireless network interfaces 904, one or more input/output interfaces 905, and one or more keyboards 906.

In an embodiment, the one or more processors 901 may be configured to execute the instructions to perform: acquiring a to-be-detected user data pair; performing feature extraction on each set of to-be-detected user data in the to-be-detected user data pair to obtain to-be-detected user features; and determining a similarity between users corresponding to the two sets of to-be-detected user data in the to-be-detected user data pair according to the to-be-detected user features and a pre-trained similarity classification model.

In an embodiment, the one or more processors 901 may be configured to execute the instructions to perform: determining to-be-detected users corresponding to the to-be-detected user data pair as twins if the similarity between the users corresponding to the two sets of to-be-detected user data in the to-be-detected user data pair is greater than or equal to a predetermined similarity classification threshold.

The embodiment of the specification provides a data similarity determining device, in which a plurality of user data pairs may be acquired, wherein data fields of two sets of user data in each user data pair have an identical part; a user similarity corresponding to each user data pair may be acquired; sample data for training a preset classification model may be determined; and the classification model may be trained based on the sample data to obtain a similarity classification model, so that a similarity between users corresponding to the two sets of to-be-detected user data in a to-be-detected user data pair can be determined according to the similarity classification model. In this way, a plurality of user data pairs may be obtained through the same data field, and an association between users corresponding to the two sets of user data in each user data pair may be determined according to the user similarity to obtain sample data for training a preset classification model, that is, the sample data can be obtained without manual labeling, so that rapid training of a model can be implemented, the model training efficiency can be improved, and the resource consumption can be reduced.

The specific embodiments of the specification have been described above. Other embodiments are within the scope of the appended claims. In some cases, the actions or steps set forth in the claims can be performed in a different order than those described in the embodiments and can still achieve the desired results. In addition, the processes depicted in the figures are not necessarily in the shown particular order or in a continuous order to achieve the desired results. In some embodiments, multitasking and parallel processing are also possible or may be advantageous.

Each of the above described methods, modules, and units may be implemented as software, or hardware, or a combination of software and hardware. For example, a Programmable Logic Device (PLO) (e.g., a Field Programmable Gate Array (FPGA)) is such an integrated circuit whose logic functions are determined by devices programmed by a user. Designers program by themselves to "integrate" a digital system into a piece of PLO, without the need to ask a chip manufacturer to design and manufacture a dedicated integrated circuit chip. Moreover, at present, the programming may be implemented by using logic compiler software, instead of manually manufacturing an integrated circuit chip. The logic compiler software may be similar o a software complier used for developing and writing a program, and original codes before compiling may be written using a specific programming language, such as a Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, or Ruby Hardware Description Language (RHDL), among which Very-High-Speed Integrated Circuit Hardware Description Language (VHDL) and Verilog are commonly used. Those skilled in the art should also know that a hardware circuit for implementing the logic method procedure may be easily obtained by slightly logically programming the method procedure using the above several hardware description languages and programming it into an integrated circuit.

A controller may be implemented in any suitable manner in the above described devices. For example, the controller may be in the form of, for example, a microprocessor or a processor and a computer readable medium storing a computer readable program code (for example, software or firmware) executable by the (micro)processor, a logic gate, a switch, an Application Specific Integrated Circuit (ASIC), a programmable logic controller, or an embedded microcontroller. Examples of the controller may include, but are not limited to, the following micro-controllers: ARC 625D, Atmel AT91SAM, Microchip PIC18F26K20, and Silicone Labs C8051F320. A memory controller may also be implemented as a part of control logic of a memory. Those skilled in the art should also know that the controller may be implemented by using pure computer readable program codes, and in addition, the method steps may be logically programmed to enable the controller to implement the same function in a form of a logic gate, a switch, an application-specific integrated circuit, a programmable logic controller and an embedded microcontroller. Therefore, this type of controller may be considered as a hardware component, and apparatuses included therein for implementing various functions may also be considered as structures inside the hardware component. Or, the apparatuses used for implementing various functions may even be considered as both software modules for implementing the method and structures inside the hardware component.

The device, apparatus, module or unit illustrated in the above embodiments may be specifically implemented by using a computer chip or a material object, or a product having a certain function. A typical implementation device is a computer Specifically, the computer can be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the above apparatuses are divided into various modules in terms of functions for respective descriptions. In some embodiments, functions of the modules may be implemented in the same or multiple pieces of software and/or hardware.

As will be appreciated by those skilled in the art, the embodiments of the specification may be a method, a device, or a computer program product. Accordingly, the embodiments may be in the form of an entirely hardware embodiment, an entirely software embodiment or an embodiment combining software and hardware aspects. Furthermore, the computer program product may be implemented on one or more computer-usable storage media (including but not limited to magnetic disk memories, CD-ROMs, optical memories, etc.) including computer-usable program code.

The embodiments are described with reference to flowcharts and/or block diagrams of the method, device (system) and computer program product. It should be understood that computer program instructions can implement each process and/or block in the flowcharts and/or block diagrams and a combination of processes and/or blocks in the flowcharts and/or block diagrams. These computer program instructions may be provided to a general-purpose computer, a special-purpose computer, an embedded processor or a processor of another programmable data processing device to generate a machine, so that an apparatus configured to implement functions specified in one or more processes in the flowcharts and/or one or more blocks in the block diagrams may be generated by using instructions executed by the computer or the processor of another programmable data processing device.

These computer program instructions may also be stored in a computer-readable storage medium that may guide a computer or another programmable data processing device to work in a specified manner, so that the instructions stored in the computer-readable storage medium may generate a product including an instruction apparatus, wherein the instruction apparatus implements functions specified in one or more processes in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device may provide steps for implementing functions specified in one or more processes in the flowcharts and/or one or more blocks in the block diagrams.

The computer-readable storage medium may include volatile and non-volatile, mobile and non-mobile media, and can use any method or technology to store information. The information may be a computer readable instruction, a data structure, a module of a program, or other data. Examples of the computer-readable storage media of the computer may include, but are not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which may be used for storing computer accessible information. The computer-readable storage medium does not include transitory computer readable media (transitory media), for example, a modulated data signal and carrier.

It should be further noted that the terms "include," "comprise" or other variations thereof are intended to cover non-exclusive inclusion, so that a process, method, product or device including a series of elements not only includes the elements, but also includes other elements not expressly listed, or further includes inherent elements of the process, method, product or device. In the absence of more limitations, an element defined by "including a/an . . . " does not exclude that the process, method, product or device including the element further has other identical elements.

The above described methods may be implemented by computer-executable instruction executed by a computer, for example, a program module. Generally, the program module includes a routine, a program, an object, an assembly, a data structure, and the like used for executing a specific task or implementing a specific abstract data type. The above described methods may also be implemented in distributed computing environments, and in the distributed computer environments, a task may be executed by using remote processing devices connected through a communications network. In the distributed computer environment, the program module may be located in local and remote computer storage media including a storage device.

The embodiments in the specification are described progressively, identical or similar parts of the embodiments may be referenced to each other, and each embodiment emphasizes an aspect different from other embodiments. Especially, the device/apparatus embodiment is basically similar to the method embodiment, and thus is described in a relatively simple manner. For related parts, reference may be made to the descriptions of the parts in the method embodiments.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A model training method, comprising:
acquiring a plurality of user data pairs, wherein each user data pair is acquired by comparing data fields of acquired user data to find two sets of user data corresponding to two different users, respectively, and having data fields that share an identical part to form the user data pair corresponding to the two different users;
acquiring a user similarity corresponding to each user data pair, wherein the user similarity is a similarity between users corresponding to the two sets of user data in each user data pair;
determining, according to the user similarity corresponding to each user data pair and the plurality of user data pairs, sample data for training a preset classification model, wherein the determining the sample data comprises:

performing feature extraction on each user data pair in the plurality of user data pairs to obtain associated user features between the two sets of user data in each user data pair; and determining, according to the associated user features between the user data in each user data pair and the user similarity corresponding to each user data pair, the sample data for training the classification model, wherein the determining comprises:

selecting positive sample features and negative sample features from user features corresponding to the plurality of user data pairs according to the user similarity corresponding to each user data pair and a predetermined similarity threshold; and using the positive sample features and the negative sample features as the sample data for training the classification model; and training the classification model based on the sample data to obtain a similarity classification model.

2. The method according to claim 1, wherein the acquiring the user similarity corresponding to each user data pair comprises:

acquiring biological features of users corresponding to a first user data pair, wherein the first user data pair is any user data pair in the plurality of user data pairs; and determining a user similarity corresponding to the first user data pair according to the biological features of the users corresponding to the first user data pair.

3. The method according to claim 2, wherein the biological features comprise a facial image feature;

the acquiring the biological features of the users corresponding to the first user data pair comprises:

acquiring facial images of the users corresponding to the first user data pair; and performing feature extraction on the facial images to obtain facial image features of the users corresponding to the first user data pair; and the determining the user similarity corresponding to the first user data pair according to the biological features of the users corresponding to the first user data pair comprises:

determining the user similarity corresponding to the first user data pair according to the facial image features of the users corresponding to the first user data pair.

4. The method according to claim 2, wherein the biological features comprise a speech feature;

the acquiring biological features of users corresponding to the first user data pair comprises:

acquiring speech data of the users corresponding to the first user data pair; and performing feature extraction on the speech data to obtain speech features of the users corresponding to the first user data pair; and the determining the user similarity corresponding to the first user data pair according to the biological features of the users corresponding to the first user data pair comprises:

determining the user similarity corresponding to the first user data pair according to the speech features of the users corresponding to the first user data pair.

5. The method according to claim 1, wherein the associated user features comprise at least one of a household registration dimension feature, a name dimension feature, a social feature, or an interest feature, wherein the household registration dimension feature comprises a feature of user identity information, the name dimension feature comprises a feature of user name information and a feature of a degree of scarcity of a user surname, and the social feature comprises a feature of social relationship information of a user.

6. The method according to claim 1, wherein the positive sample features comprise the same quantity of features as the negative sample features.

7. The method according to claim 1, wherein the similarity classification model is a binary classifier model.

8. The method according to claim 1, further comprising:

acquiring a to-be-detected user data pair, the to-be-detected user data pair including two sets of to-be-detected user data;

performing feature extraction on each set of to-be-detected user data in the to-be-detected user data pair to obtain to-be-detected user features; and determining a similarity between users corresponding to the two sets of to-be-detected user data in the to-be-detected user data pair according to the to-be-detected user features and the similarity classification model.

9. The method according to claim 8, further comprising:

determining to-be-detected users corresponding to the to-be-detected user data pair as twins if the similarity between the users corresponding to the two sets of to-be-detected user data in the to-be-detected user data pair is greater than a predetermined similarity classification threshold.

10. A model training device, comprising:

a processor; and a memory configured to store instructions, wherein the processor is configured to execute the instructions to:

acquire a plurality of user data pairs, wherein each user data pair is acquired by comparing data fields of acquired user data to find two sets of user data corresponding to two different users, respectively, and having data fields that share an identical part to form the user data pair corresponding to the two different users;

acquire a user similarity corresponding to each user data pair, wherein the user similarity is a similarity between users corresponding to the two sets of user data in each user data pair;

determine, according to the user similarity corresponding to each user data pair and the plurality of user data pairs, sample data for training a preset classification model, wherein determining the sample data comprises:

performing feature extraction on each user data pair in the plurality of user data pairs to obtain associated user features between the two sets of user data in each user data pair; and determining, according to the associated user features between the user data in each user data pair and the user similarity corresponding to each user data pair, the sample data for training the classification model, wherein the determining comprises:

selecting positive sample features and negative sample features from user features corresponding to the plurality of user data pairs according to the user similarity corresponding to each user data pair and a predetermined similarity threshold; and using the positive sample features and the negative sample features as the sample data for training the classification model; and train the classification model based on the sample data to obtain a similarity classification model.

11. The device according to claim 10, wherein the processor is further configured to execute the instructions to:
- acquire biological features of users corresponding to a first user data pair, wherein the first user data pair is any user data pair in the plurality of user data pairs; and
- determine a user similarity corresponding to the first user data pair according to the biological features of the users corresponding to the first user data pair.

12. The device according to claim 11, wherein the biological features comprise a facial image feature, and the processor is further configured to execute the instructions to:
- acquire facial images of the users corresponding to the first user data pair; and perform feature extraction on the facial images to obtain facial image features of the users corresponding to the first user data pair; and
- determine the user similarity corresponding to the first user data pair according to the facial image features of the users corresponding to the first user data pair.

13. The device according to claim 11, wherein the biological features comprise a speech feature, and the processor is further configured to execute the instructions to:
- acquire speech data of the users corresponding to the first user data pair; and perform feature extraction on the speech data to obtain speech features of the users corresponding to the first user data pair; and
- determine the user similarity corresponding to the first user data pair according to the speech features of the users corresponding to the first user data pair.

14. The device according to claim 10, wherein the associated user features comprise: a household registration dimension feature, a name dimension feature, a social feature, and an interest feature, wherein the household registration dimension feature comprises a feature of user identity information, the name dimension feature comprises a feature of user name information and a feature of a degree of scarcity of a user surname, and the social feature comprises a feature of social relationship information of a user.

15. The device according to claim 10, wherein the positive sample features comprise the same quantity of features as the negative sample features.

16. The device according to claim 10, wherein the similarity classification model is a binary classifier model.

* * * * *